(12) United States Patent
DeCusatis et al.

(10) Patent No.: US 8,005,972 B2
(45) Date of Patent: Aug. 23, 2011

(54) DETECTION OF INCONSISTENT DATA IN COMMUNICATIONS NETWORKS

(75) Inventors: Casimer M. DeCusatis, Poughkeepsie, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 11/426,421

(22) Filed: Jun. 26, 2006

(65) Prior Publication Data

US 2007/0299963 A1 Dec. 27, 2007

(51) Int. Cl.
*G06F 15/16* (2006.01)
(52) U.S. Cl. ......................... 709/231; 709/236
(58) Field of Classification Search .................... 709/231
See application file for complete search history.

(56) References Cited

U.S. PATENT DOCUMENTS

| | | | | |
|---|---|---|---|---|
| 5,115,432 | A | 5/1992 | Haas | 370/94.1 |
| 5,151,899 | A | 9/1992 | Thomas et al. | 370/94.1 |
| 6,205,143 | B1 * | 3/2001 | Lemieux | 370/395.61 |
| 6,587,441 | B1 * | 7/2003 | Urban et al. | 370/310 |
| 6,615,221 | B2 | 9/2003 | Warner et al. | 707/104.1 |
| 6,757,248 | B1 * | 6/2004 | Li et al. | 370/235 |
| 6,836,466 | B1 | 12/2004 | Kant et al. | 370/252 |
| 6,853,641 | B2 | 2/2005 | Lindhorst-Ko et al. | 370/394 |
| 6,910,178 | B1 * | 6/2005 | Kiselev et al. | 714/819 |
| 7,061,856 | B2 * | 6/2006 | Banerjee | 370/216 |
| 2004/0034699 | A1 * | 2/2004 | Gotz et al. | 709/223 |
| 2004/0044766 | A1 * | 3/2004 | Pauly et al. | 709/225 |
| 2004/0058682 | A1 | 3/2004 | Kitchin | 455/445 |
| 2004/0062248 | A1 | 4/2004 | Nagarajan et al. | 370/394 |
| 2004/0103351 | A1 * | 5/2004 | Hirst | 714/710 |
| 2005/0078653 | A1 | 4/2005 | Agashe et al. | 370/349 |
| 2005/0204028 | A1 * | 9/2005 | Bahl et al. | 709/223 |
| 2005/0216783 | A1 | 9/2005 | Sundaram et al. | |
| 2006/0255144 | A1 * | 11/2006 | Meier et al. | 235/454 |
| 2007/0076885 | A1 * | 4/2007 | Sood et al. | 380/270 |
| 2007/0239648 | A1 * | 10/2007 | Thota | 706/47 |

OTHER PUBLICATIONS

American National Standard for Telecommunications—Generic Framing Procedure—ANSI T1.xxx.yy-200x, www.ieee802.org/rprsg/public/presentations/May 2001/gfp.pdf, available from ANSI, 11 West 42nd Street, New York, NY 10036.

* cited by examiner

*Primary Examiner* — Jeffrey Pwu
*Assistant Examiner* — Shaq Taha
(74) *Attorney, Agent, or Firm* — Steven Chiu, Esq; Kevin P. Radigan, Esq.; Heslin Rothenberg Farley & Mesiti P.C.

(57) ABSTRACT

Inconsistent data in communications networks is detected. The detection is performed by a component of the network that is separate from where the recovery takes place. The detection employs a packet sequence number, which is checked when the packet is received. The packet sequence number is initialized to define a valid window of packet sequence numbers.

19 Claims, 6 Drawing Sheets

DETECTION OF INCONSISTENT DATA IN COMMUNICATIONS NETWORKS

TECHNICAL FIELD

This invention relates, in general, to processing within communications networks and, in particular, to detecting inconsistent data within the communications networks.

BACKGROUND OF THE INVENTION

Inconsistent data, such as duplicate data or out-of-order data, can arise from various operating conditions, including data re-transmission resulting from previous error recovery actions, as well as from other conditions. The integrity of this type of data is suspect, and thus, problematic.

Certain communications protocols are configured with an assumption that the data cannot be duplicated or be out-of-order. Examples of these protocols include Intersystem Channel (ISC), ESCON® and FICON® protocols offered by International Business Machines Corporation. Violation of this assumption may cause catastrophic failures, affecting operation of the entire system.

Although these protocols assume the data cannot be duplicated or out-of-order, this may not be necessarily true when these protocols are used in communications networks that also include other protocols. For example, to transport data over longer distances, ISC or other protocols may be used in conjunction with a Synchronous Optical Network (SONET) or Internet Protocol (IP) network to transport the data. When combining the different protocols, the data on the ISC links may become inconsistent.

SUMMARY OF THE INVENTION

Based on the foregoing, a need exists for a capability to detect inconsistent data, even for protocols that assume the data is consistent. In particular, a need exists for a capability to detect inconsistent data, in which the recovery of the data is performed independently of the detecting.

The shortcomings of the prior art are overcome and additional advantages are provided through the provision of a method of detecting inconsistent data in a communications network. The method includes, for instance, obtaining, by an interface of the communications network, data output from a network fabric of the communications network; and detecting by the interface that the data is inconsistent data, wherein the detecting of the inconsistent data and recovery of the inconsistent data are independent in that the recovery is not performed by the interface that detected the inconsistent data.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for detecting inconsistent data in a communications network that includes communications protocols configured to assume that there is no inconsistent data. Inconsistent data includes duplicate data and/or out-of-order data. The detecting is performed by a component of the network (e.g., an interface) that is separate from where the recovery takes place. That is, the component performing the detecting does not perform the recovery. The detecting and recovery are independent of one another.

Figure 1:
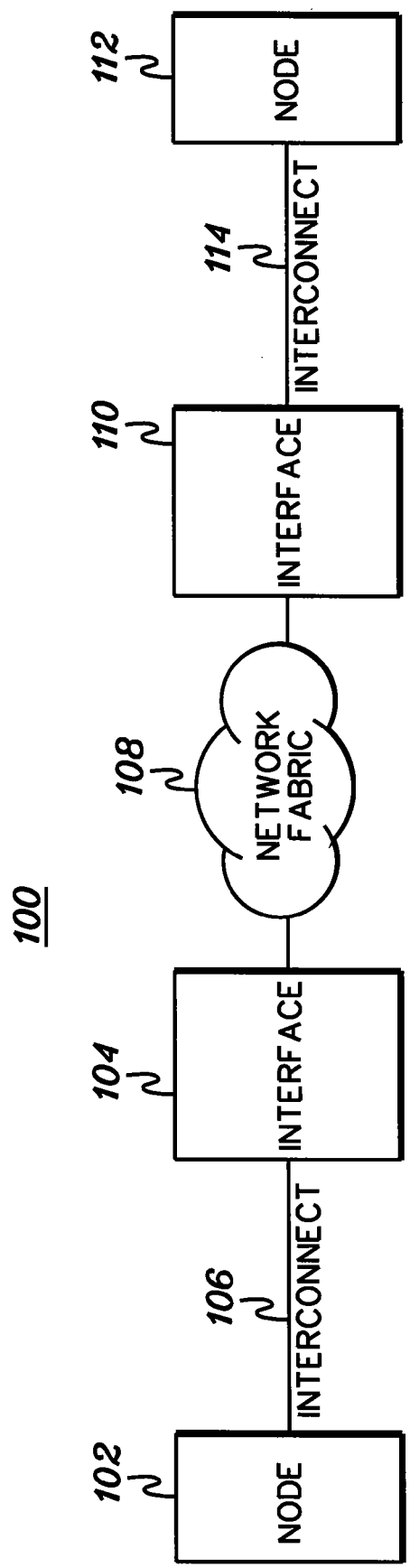
FIG. 1 depicts one example of a communications network incorporating and using one or more aspects of the present invention.

One embodiment of a communications network incorporating and using one or more aspects of the present invention is described with reference to FIG. 1. Depicted in FIG. 1 is a wide area network 100 that includes, for instance, a node 102 coupled to an interface 104 via an interconnect 106. Interface 104 is coupled to and sits at the edge of a network fabric 108. At the other edge of the fabric is another interface 110 coupled to a node 112 via an interconnect 114. Nodes 102, 112 are, for instance, eServer zSeries® servers offered by International Business Machines Corporation. In this embodiment, the nodes are part of a Graphically Dispersed Parallel Sysplex (GDPS®) offered by IBM®. GDPS is a multi-site or single-site end-to-end application availability solution that provides the capability to manage remote copy configuration and storage subsystems to automate Parallel Sysplex operation tasks and perform failure recovery from a single point of control. GDPS helps automate recovery procedures for planned and unplanned outages to provide near-continuous availability and disaster recovery capability.

IBM, zSeries, GDPS, ESCON and FICON are registered trademarks of International Business Machines Corporation, Armonk, N.Y., USA. Other names used herein may be registered trademarks, trademarks or product names of International Business Machines Corporation or other companies.

Each of nodes 102, 112 is coupled to an interface via an interconnect. Interconnects 106, 114 are, for instance, intersystem channel (ISC) links, which are designed based on a protocol that assumes data (e.g., packets) cannot be duplicated or arrive out-of-order.

The interfaces coupled to the interconnects are, for instance, wavelength division multiplexers that include encapsulation/un-encapsulation functionality. The encapsulation function transforms the data received by the interfaces in a format understandable by the fabric and the un-encapsulation fabric transforms the data back into a format understandable by the nodes.

In one example, network fabric 108 includes, for instance, a Synchronous Optical Network (SONET), which is a transport infrastructure for worldwide telecommunications. It is an American National Standards Institute (ANSI) standard. As another example, the fabric may be an internet protocol (IP) network or other type of network.

Traffic flows across the network from one node to another node. However, the network fabric does not understand the data from the node, and therefore, the data is encapsulated into a form understandable by the network fabric. As one example, a Generic Frame Procedure (GFP), which is an ANSI standard, is used to encapsulate the data received from node 102, 112 to a format understandable by network fabric 108. One embodiment of this encapsulation procedure is described below with reference to FIG. 2A. This procedure is performed by, for instance, the interface through which the data flows to the fabric. Further details regarding GFP are also described in American National Standard for Telecommunications—Generic Framing Procedure—ANSI Ti.xxx.yy-200x, www.ieee802.org/rprsg/public/presentations/May 2001/gfp.pdf, available from ANSI, 11 West $42^{nd}$ Street, New York, N.Y. 10036, which is hereby incorporated herein by reference in its entirety.

Figure 2A:
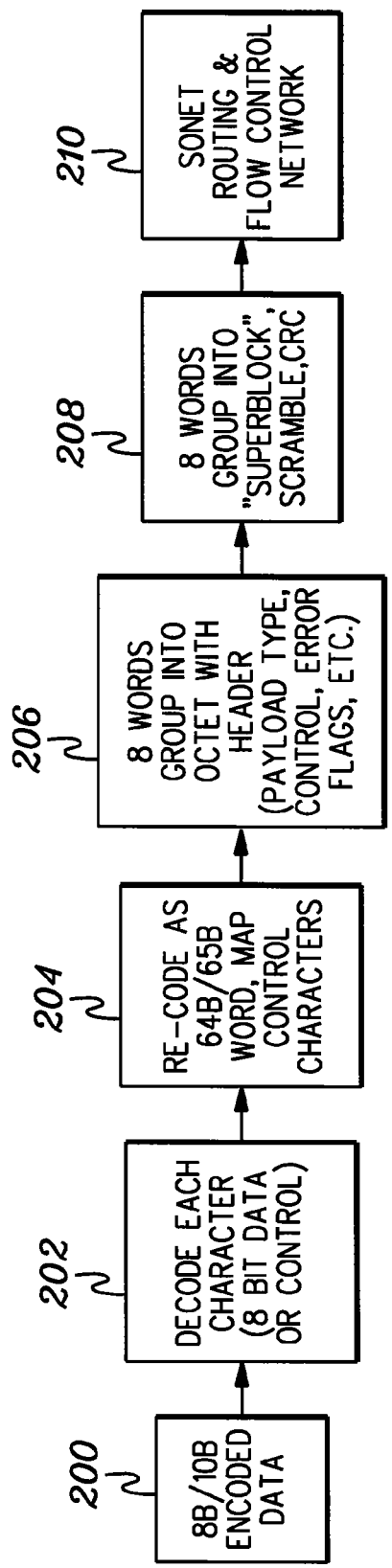
FIG. 2A depicts one embodiment of logic associated with encapsulating/un-encapsulating data transported within the communications network, in accordance with an aspect of the present invention.

Referring to FIG. 2A, the data received from the node is 8 bit/10 bit encoded data, which is not fundamentally compatible with various routing and flow control protocols, such as SONET, STEP 200. Thus, the 8 bit/10 bit encoded data is decoded one character at a time, STEP 202. Each character is decoded into 8 bit data or control characters. This data is then re-encoded as 64 bit/65 bit word and/or map control characters, STEP 204. Thereafter, the newly encoded data blocks are concatenated together to form octets, STEP 206. That is, eight words of data are grouped into an octet, and that octet is provided with a header that includes fields having various information, including the type of payload (such as ESCON®, fiber channel, etc.), a CRC check and other fields, if desired. The octet is grouped into a superblock, scrambled and a further CRC check is applied to ensure that the scramble is accurate, STEP 208. The data is then forwarded to the SONET routing and flow control network, STEP 210.

The output of the SONET network is received at another interface, which un-encapsulates the data by performing the Generic Frame Procedure in reverse order. The un-encapsulated data is then provided to the node coupled to that interface.

Figure 2B:
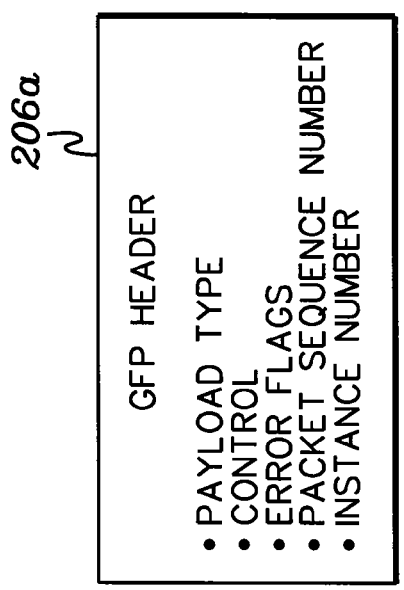
FIG. 2B depicts one embodiment of a header employed in the encapsulation/un-encapsulation procedure modified in accordance with an aspect of the present invention.

In accordance with an aspect of the present invention, the frame encapsulation/un-encapsulation functionality is modified to include a packet sequence number (PSN) employed in the detection of inconsistent data. In particular, the header provided in STEP 206 is modified (see 206A, FIG. 2B) to include the packet sequence number, which is, for instance, a 24 bit number. The header also includes an optional instance number, described further below. In one embodiment, the packet sequence number is added, if the data is of a chosen protocol, e.g., ISC peer mode or STP data. However, in another embodiment, the packet sequence number is added regardless of the protocol.

The packet sequence number is added as part of the encapsulation procedure, and checked as part of the un-encapsulation procedure. For instance, the packet sequence number is initialized and as each packet of data is transmitted, the packet sequence number is incremented by one, as one example, on the transmit side of the link. On the receive side, when un-encapsulating the data, each packet sequence number is checked to make sure that it is valid. This is described further with reference to FIGS. 3-4.

Figure 3:
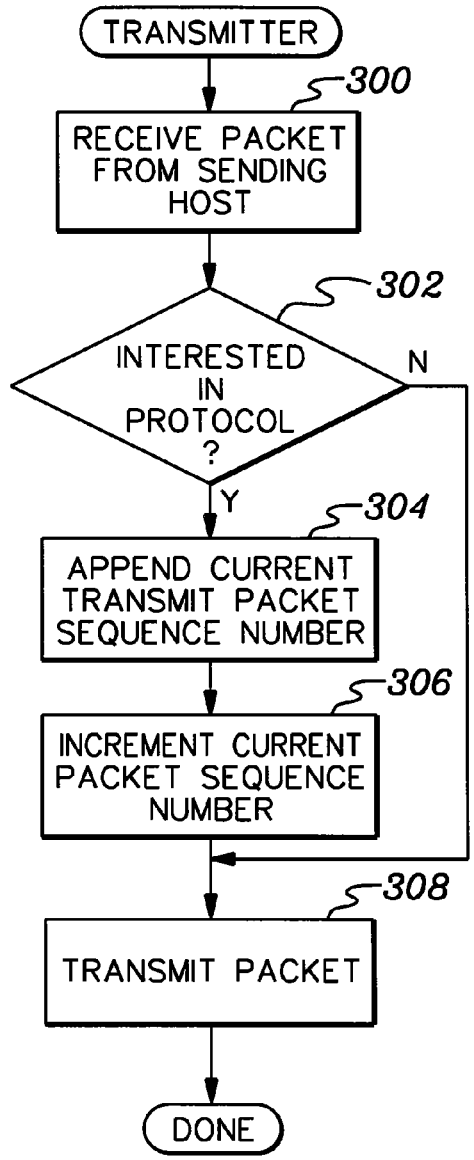
FIG. 3 depicts one embodiment of the logic associated with appending a packet sequence number to data, in accordance with an aspect of the present invention.

Referring to FIG. 3, the logic associated with the transmit side is described. The transmitter, in this embodiment, is the interface forwarding the data to the network fabric (e.g., interface 104). The interface is modified or designed to include the functionality described in FIG. 3. The transmitter receives a packet from the sending host (e.g., node 102), STEP 300. A determination is then made as to whether the packet is of a protocol that the transmitter is interested in, STEP 302. In one example, this determination is made by checking a data structure (e.g., table) of interested protocols. If it is a protocol in which the system is interested in having a packet sequence number associated therewith (e.g., ISC peer mode, ISC carrying the Server Time Protocol (STP)), then a packet sequence number is appended to the packet being transmitted, STEP 304. For instance, the packet sequence number is added to the GFP header, described above. Additionally, the current packet sequence number is incremented by one, in one example, STEP 306. Thereafter, or if the packet is not of a protocol that the transmitter is interested in, the packet is transmitted (subsequent to completing encapsulation), STEP 308. The packet is transmitted over the network fabric and is received by a receiver, such as another wavelength division multiplexer with encapsulation/un-encapsulation abilities (e.g., interface 110).

Figure 4:
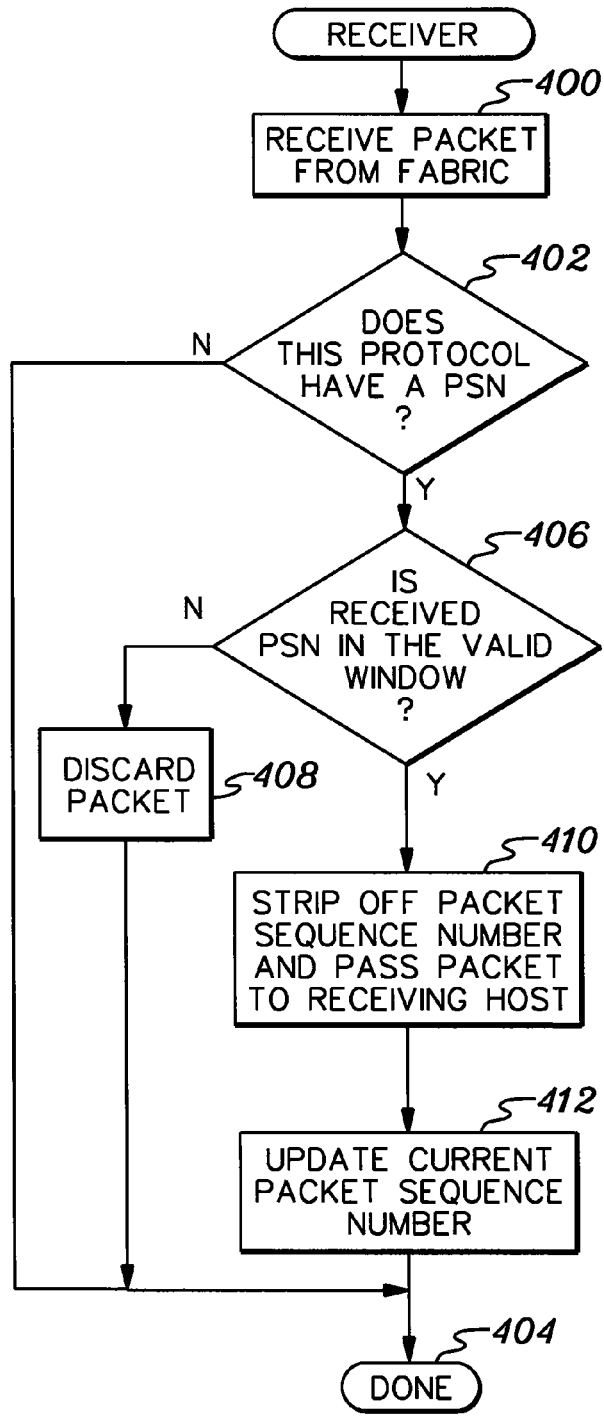
FIG. 4 depicts one embodiment of the logic associated with checking the packet sequence number to determine whether the data is to be discarded, in accordance with an aspect of the present invention.

One embodiment of the logic associated with handling the packet received is described with reference to FIG. 4. Initially, the packet is received from the fabric, STEP 400. A determination is made as to whether the protocol is one in which a packet sequence number should be included with the data, INQUIRY 402. If not, the packet is passed to the receiving host, as before, STEP 404. However, if the protocol supports a packet sequence number, then a further inquiry is made to determine whether the packet sequence number is within a valid window, INQUIRY 406. This determination is described in further detail below. If the packet sequence number is not in the valid window, then the packet is discarded, STEP 408, and processing of the packet is complete, STEP 404. However, if the packet sequence number is in the valid window, then the packet sequence number is stripped from the packet and the packet is passed to the receiving host (subsequent to completing un-encapsulation), STEP 410. The current packet sequence number at the receiver is then updated, STEP 412. This completes processing of the received packet, STEP 404.

It should be noted that an interface can be both a receiver and a transmitter, depending on whether the interface is receiving or transmitting data at that particular point in time.

To determine whether a packet sequence number received by a receiver is valid, the packet sequence number is checked to make sure, for instance, that it is larger than the previously received packet sequence number. This can be implemented in a number of different ways. In one example, a window for valid data and for duplicated data based on packet sequence numbers is defined. Consecutive packet sequence numbers are subtracted from one another and if the result is one or less than $2^{23}$, then the packet is not in the duplicate range (i.e., valid). If the result is zero, but not more negative than $2^{23}$, the received packet is in the duplicate range and is discarded. Examples of valid and invalid windows are described with reference to FIGS. 5A, 5B.

Figure 5A:
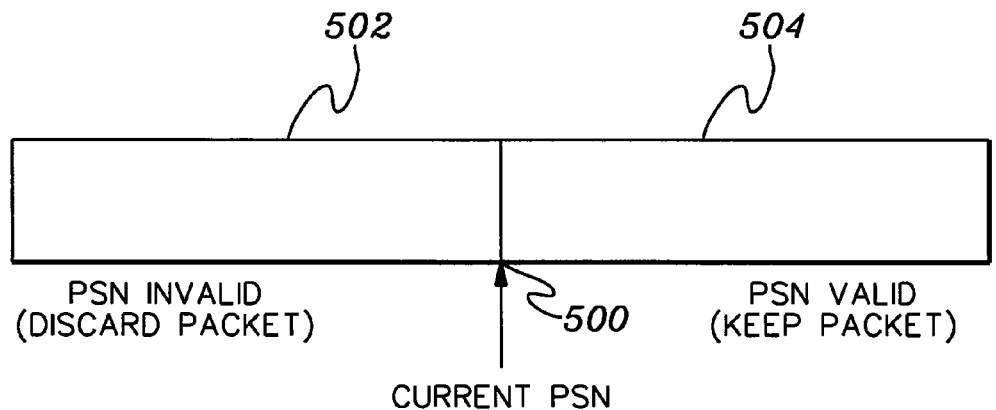
FIG. 5A depicts examples of valid/invalid packet sequence number windows, in accordance with an aspect of the present invention.

As shown in FIG. 5A, a current PSN is at reference number 500. A packet sequence number prior to the current packet sequence number is invalid (502) and the packet is discarded. A packet sequence number after the current packet sequence number is valid 504 and the packet is kept.

Figure 5B:
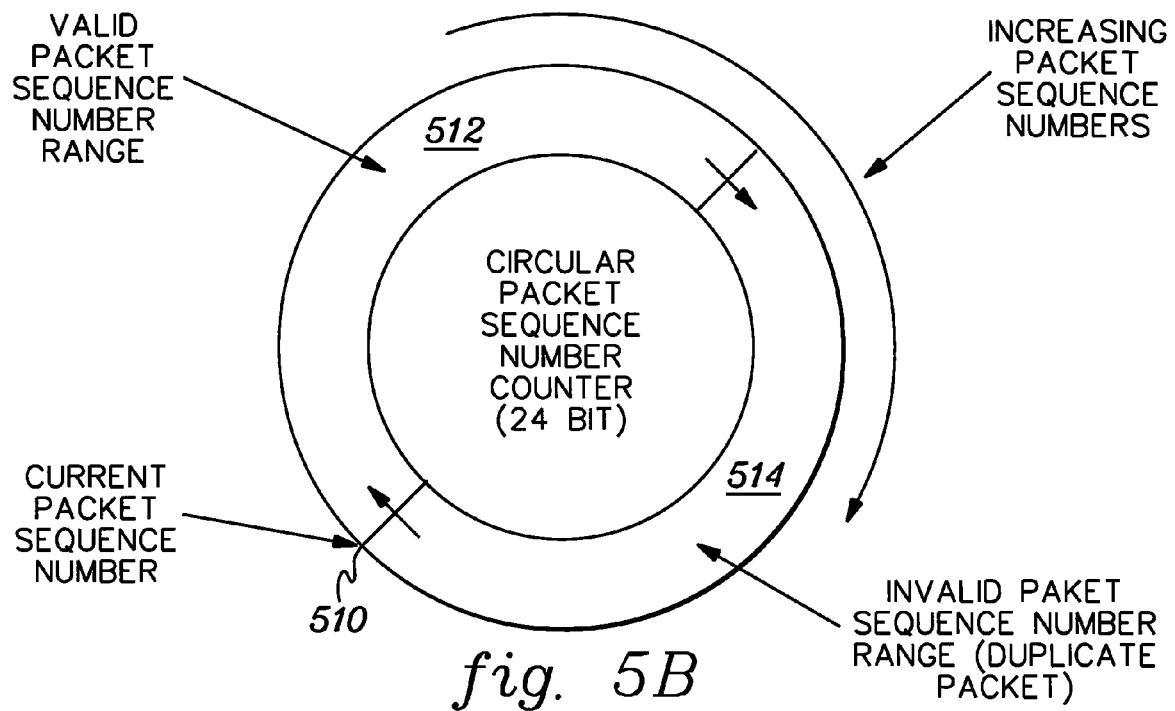
FIG. 5B depicts further examples of valid/invalid packet sequence number windows, in accordance with an aspect of the present invention.

Similarly, as shown in FIG. 5B, the current packet sequence number is at reference 510. The window or range in front of the current packet sequence number on the wheel is considered a valid packet sequence number window or range 512. At 514, however, the packet sequence number is considered in the invalid window or range signifying a duplicate packet.

Figure 6A:
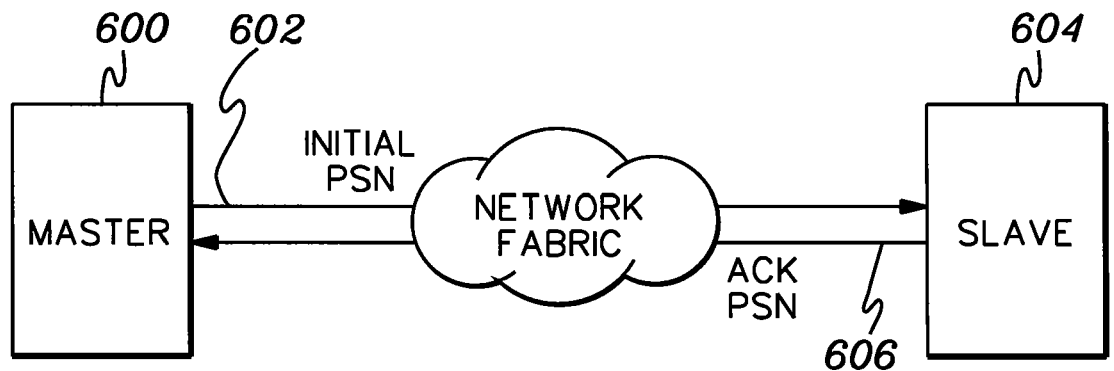
FIG. 6A depicts one embodiment of a packet sequence number link initialization procedure in which a handshake approach is used, in accordance with an aspect of the present invention.

The definition of the valid data window or range depends on knowing when the data begins to be transmitted. Thus, the packet sequence number is initialized and the source and destination are maintained in synchronization. This is accomplished in a number of different ways. In one example, one endpoint of the network is defined as the master, and the other as a slave. The master endpoint sends a message to the slave telling the slave the initial value of the packet sequence number, the next sequence number to expect, and the packet sequence number to use when the slave sends the next packet back to the master on a duplex link. The master and slave handshake upon link initialization or re-initialization. This is depicted in FIG. 6A As shown, a master 600 (e.g., interface 104) sends an initial packet sequence number 602 and any other required or desired information to a slave 604 (e.g., interface 110). The slave responds 606 by verifying receipt of this information. Transmission of data then commences.

Additionally, the master keeps state information about the last packet sequence number used before re-initialization to avoid having old packets mistaken for good packets in the valid packet sequence window. This approach is transparent to GFP or IP encapsulation techniques. Overhead from the handshake is expected to be very low, since the ISC/STP links do not reinitialize frequently.

Figure 6B:
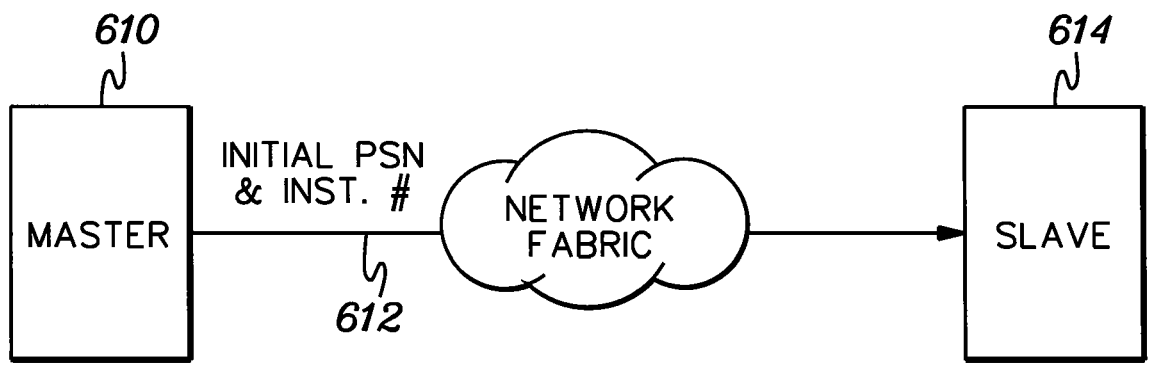
FIG. 6B depicts one embodiment of a packet sequence number link initialization procedure in which an instance number approach is used, in accordance with an aspect of the present invention.

In another approach, the round-trip handshake is avoided. In this approach, an instance number (e.g., 1-3 bits) is added to the packet along with the packet sequence number (see FIG. 2B). Thus, a master 610 (FIG. 6B) (e.g., interface 104) sends the initial packet sequence number and the instance number (612) to a slave 614 (e.g., interface 110), in response to, for instance, link initialization or re-initialization. Packets received with any instance number other than the current instance number are discarded by the receiver. The instance number is incremented each time a pair of endpoints is initialized. For example, the master node may initialize its slave node by sending a new instance number with a new packet sequence number. In this manner, the initial packet sequence number may be set arbitrarily. In either case, whether or not the handshake approach is used, the packet sequence number and/or instance number is to be re-initialized each time the links change their status. Link initialization requires very little bandwidth and happens infrequently, so this is not expected to significantly impact performance.

In a further embodiment, the instance number may be used in a roundtrip response. In this embodiment, the master does not need to remember the present packet sequence number. Instead, it only remembers the present instance number, which may be a much smaller quantity. In this embodiment, each time the instance number is re-established, the starting packet sequence number is hardwired to zero (or another value) and does not have to be transmitted over the link.

In yet a further embodiment, as an alternate to the window approach, a check can be made as to whether the new PSN is exactly one (or another defined number) more (or less or other defined values) than the previous PSN. This would detect dropped frames, as well.

Described above is a simple, yet reliable mechanism for packet sequencing on links which assume there are no duplicate packets. These links include STP and ISC links, but also may include other links and/or other protocols. The detection and prevention of inconsistent frames in an ISC or STP link (or others), extended over long distances using SONET or IP (or other) encapsulation is provided. This approach relies on the inherent recovery capabilities of the links and/or nodes rather than adding recovery mechanisms, additional buffering and controls to the fabric. Advantageously, this approach avoids retransmission attempts on the link. Since the link protocols do not experience any flow control problems at extended distances, this approach enables the efficient transmission of data over legacy fiber optic infrastructures to hundreds or thousands of kilometers.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 7:
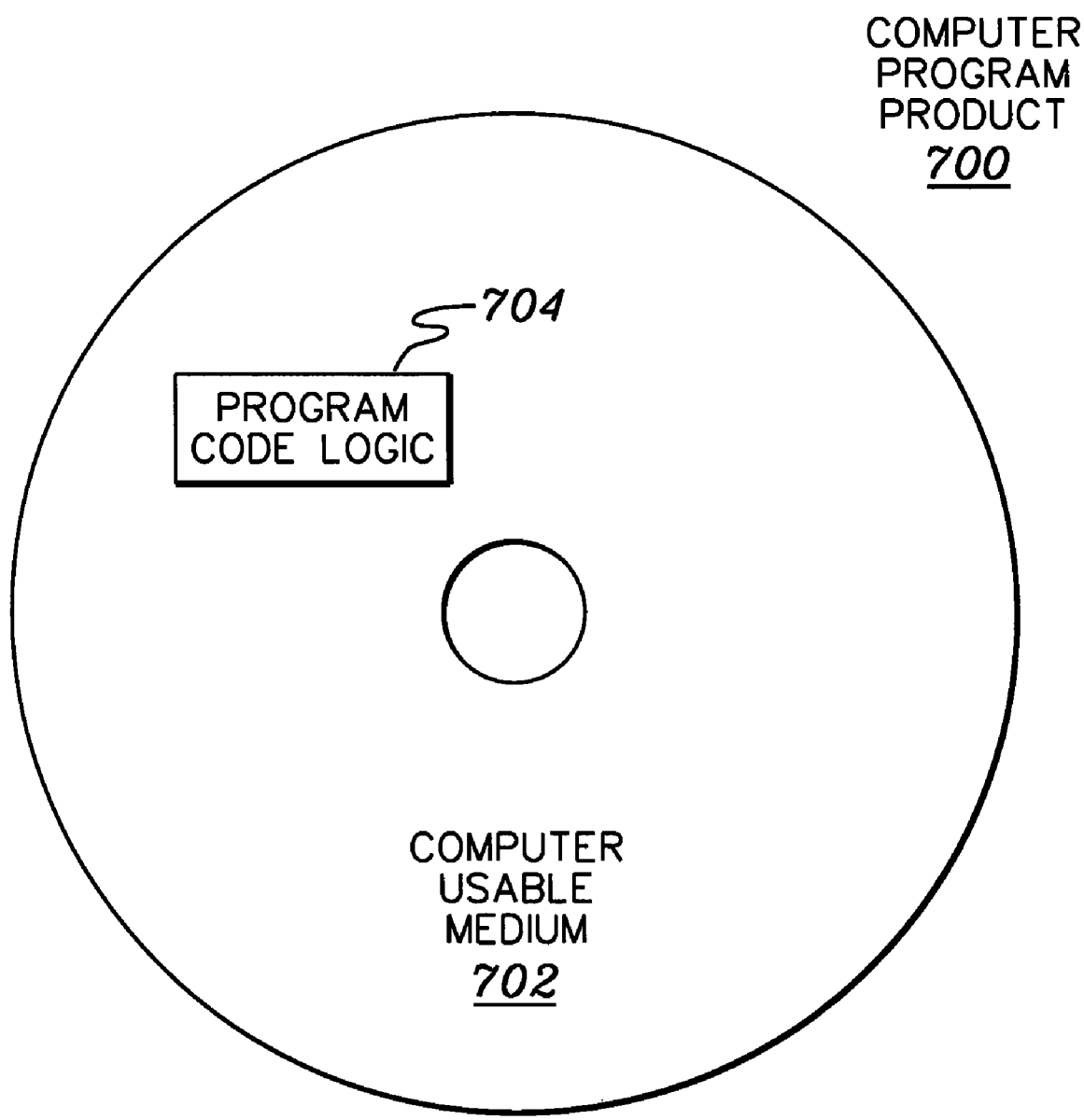
FIG. 7 depicts one example of a computer program product incorporating one or more aspects of the present invention.

One example of an article of manufacture or a computer program product incorporating one or more aspects of the present invention is described with reference to FIG. 7. A computer program product 700 includes, for instance, one or more computer usable media 702 to store computer readable program code means or logic 704 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples. Many changes, additions or deletions may be made without departing from the spirit of the present invention. For example, the nodes may be other than servers and/or other than IBM® servers. Additionally, the links may be other than ISC/STP links and the network fabric can be other than SONET or IP. Additionally, the interfaces may be other than wavelength division multiplexers and encapsulation/un-encapsulation protocols may be other than SONET/IP. There may be additional nodes, interfaces, interconnects and/or fabrics. The nodes and communications network need not be part of GDPS. They can be part of another system or not. Many other changes, additions, deletions may be made without departing from the spirit of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the available types of network adapters.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method comprising:
identifying inconsistent data in an external data communications network, the inconsistent data associated with data being forwarded from a sending node to a receiving node, the data being transmitted from the sending node using a first communications protocol that assumes transmitted data is consistent, meaning that data is not duplicated or arriving out of order, the identifying comprising:
obtaining, by a network interface of the data communications network, transmitted data forwarded across a network switch fabric of the data communications network employing a second communications protocol, the second communications protocol employing a sequence number attached to the forwarded data, as part of forwarding the data from the sending node to the receiving node, wherein transmitting the data across the network switch fabric of the data communications network results in inconsistent data, the inconsistent data comprising inconsistently sequenced data resulting from transmission of the data over the network switch fabric of the data communications network employing the second communications protocol, the inconsistently sequenced data meaning that data is duplicated or arriving out of order, and the second communications protocol being different from the first communications protocol, wherein the second communications protocol does not assume that data is consistent;
detecting by the network interface the inconsistent data, wherein the detecting of the inconsistent data and a recovery of the data responsive to detecting of the inconsistent data are independent in that the recovery is not performed by the network interface that detects the inconsistent data but by the receiving node of the data communications network separate and apart from the network interface detecting the inconsistent data, the receiving node and the network interface being coupled via an interconnect link, the interconnect link being separate from and independent of the network switch fabric of the data communications network; and
wherein the network interface resides at an edge of the network switch fabric, and wherein recovery is performed by the receiving node of the data communications network external to the network interface and coupled to the network interface via the interconnect link, the interconnect link being designed based on the first communications protocol that assumes forwarded data is consistent, the receiving node and the interconnect link residing external to and separate from the network switch fabric.

2. The method of claim 1, wherein the inconsistent data comprises at least one of duplicated data or out-of-order data, and wherein the data communications network includes multiple data communications protocols, the multiple data communications protocols comprising the first data communications protocol that assumes forwarded data cannot be duplicated or out-of-order and the second data communications protocol that does not assume the forwarded data cannot be out-of-order or duplicated.

3. The method of claim 1, wherein the detecting comprises referencing the sequence number attached to the forwarded data in determining whether the forwarded data is out of sequence in a sequence of sequentially numbered data frames, and is therefore inconsistent data.

4. The method of claim 3, further comprising including the sequence number with the forwarded data, said including being performed by another network interface of the communications network when encapsulating data for transport across the network switch fabric to the network interface, wherein the encapsulated data is understandable by the network switch fabric and wherein the forwarded data output from the network switch fabric and obtained by the network interface includes the sequence number.

5. The method of claim 4, wherein the detecting comprises stripping by the network interface the sequence number from the forwarded data in an un-encapsulate procedure used to provide data understandable by the node coupled to the network interface via the interconnect link and checking the sequence number to determine whether it is valid, wherein an invalid sequence number indicates inconsistent data.

6. The method of claim 3, wherein the detecting comprises determining whether the sequence number is in a valid data window, wherein a sequence number in an invalid data window indicates the forwarded data associated with that sequence number is inconsistent data.

7. The method of claim 6, further comprising initially defining the valid data window, wherein the initially defining comprises indicating an initial sequence number to be used in defining the valid data window, the initial sequence number being provided to the network interface in response to initialization or re-initialization of one or more interconnects of the data communications network used to transport data.

8. The method of claim 7, wherein the indicating comprises:
sending the initial sequence number from one end of the data communications network to another end of the data communications network; and
acknowledging by the another end of the data communications network receipt of the initial sequence number.

9. The method of claim 6, further comprising initially defining the valid data window, wherein the initially defining comprises indicating an instance number to be used in defining the valid data window, the instance number being provided to the network interface in response to initialization or re-initialization of one or more interconnects of the communications network used to transport data, wherein the instance number is distinct from the sequence number.

10. The method of claim 1, wherein the data communications network comprises the sending node, the sending node forwarding data to a transmitting network interface via a first interconnect link, the transmitting network interface encapsulating the data into a form understandable by the network switch fabric, the network switch fabric receiving the encapsulated data and forwarding the encapsulated data to the network interface, wherein the network interface unencapsulates the encapsulated data and detects data inconsistencies comprising inconsistently sequenced data.

11. A computer system comprising:
a memory; and
a processor in communications with the memory, wherein the computer system is configured to perform:
identifying inconsistent data in an external data communications network, the inconsistent data associated with data being forwarded from a sending node to a receiving node, the data being transmitted from the sending node using a first communications protocol that assumes transmitted data is consistent, meaning that data is not duplicated or arriving out of order, the identifying comprising:
obtaining, by a network interface of the data communications network, transmitted data forwarded across a network switch fabric of the data communications network employing a second communications protocol, the second communications protocol employing a sequence number attached to the forwarded data, as part of forwarding the data from the sending node to the receiving node, wherein transmitting the data across the network switch fabric of the data communications network results in inconsistent data, the inconsistent data comprising inconsistently sequenced data resulting from transmission of the data over the network switch fabric of the data communications network employing the second communications protocol, the inconsistently sequenced data meaning that data is duplicated or arriving out of order, and the second communications protocol being different from the first communications protocol, wherein the second communications protocol does not assume that data is consistent;
detecting by the network interface the inconsistent data, wherein the detecting of the inconsistent data and a recovery of the data responsive to detecting of the inconsistent data are independent in that the recovery is not performed by the network interface that detects the inconsistent data but by the receiving node of the data communications network separate and apart from the network interface detecting the inconsistent data, the receiving node and the network interface being coupled via an interconnect link, the interconnect link being separate from and independent of the network switch fabric of the data communications network; and
wherein the network interface resides at an edge of the network switch fabric, and wherein recovery is performed by the receiving node of the data communications network external to the network interface and coupled to the network interface via the interconnect link, the interconnect link being designed based on the first communications protocol that assumes forwarded data is consistent, the receiving node and the interconnect link residing external to and separate from the network switch fabric.

12. The computer system of claim 11, wherein the network interface employs the sequence number attached to the forwarded data in determining whether the forwarded data is out of sequence in a sequence of sequentially numbered data frames, and is therefore inconsistent data.

13. The computer system of claim 12, wherein the network interface determines whether the sequence number is in a valid data window, wherein a sequence number in an invalid data window indicates the forwarded data associated with that sequence number is inconsistent data.

14. The computer system of claim 13, further comprising initially defining the valid data window, wherein the initially defining comprises indicating an initial sequence number to be used in defining the valid data window, the initial sequence number being provided to the network interface in response to initialization or re-initialization of one or more interconnects of the data communications network used to transport data.

15. The computer system of claim 13, further comprising initially defining the valid data window, wherein the initially defining comprises indicating an instance number to be used in defining the valid data window, the instance number being provided to the network interface in response to initialization or re-initialization of one or more interconnects of the data communications network used to transport data.

16. A computer program product comprising:
a non-transitory storage medium readable by a processing circuit and storing instructions for execution by the processing circuit for performing a method, the method comprising:
identifying inconsistent data in an external data communications network, the inconsistent data associated with data being forwarded from a sending node to a receiving node, the data being transmitted from the sending node using a first communications protocol that assumes transmitted data is consistent, meaning that data is not duplicated or arriving out of order, the identifying comprising:
obtaining, by a network interface of the data communications network, transmitted data forwarded across a network switch fabric of the data communications network employing a second communications protocol, the second communications protocol employing a sequence number attached to the forwarded data, as part of forwarding the data from the sending node to the receiving node, wherein transmitting the data across the network switch fabric of the data communications network results in inconsistent data, the inconsistent data comprising inconsistently sequenced data resulting from transmission of the data over the network switch fabric of the data communications network employing the second communications protocol, the inconsistently sequenced data moaning that data is duplicated or arriving out of order, and the second communications protocol being different from the first communications protocol, wherein the second communications protocol does not assume that data is consistent;

detecting by the network interface the inconsistent data, wherein the detecting of the inconsistent data and a recovery of the data responsive to detecting of the inconsistent data are independent in that the recovery is not performed by the network interface that detects the inconsistent data but by the receiving node of the data communications network separate and apart from the network interface detecting the inconsistent data, the receiving node and the network interface being coupled via an interconnect link, the interconnect link being separate from and independent of the network switch fabric of the data communications network; and wherein the network interface resides at an edge of the network switch fabric, and wherein recovery is performed by the receiving node of the data communications network external to the network interface and coupled to the network interface via the interconnect link, the interconnect link being designed based on the first communications protocol that assumes forwarded data is consistent, the receiving node and the interconnect link residing external to and separate from the network switch fabric.

17. The computer program product of claim 16, wherein the network interface employs the sequence number attached to the forwarded data in determining whether the forwarded data is out of sequence in a sequence of sequentially numbered data frames, and is therefore inconsistent data.

18. The computer program product of claim 17, wherein the detecting comprises determining whether the sequence number is in a valid data window, wherein a sequence number in an invalid data window indicates the forwarded data associated with that sequence number is inconsistent data.

19. The computer program product of claim 18, further comprising initially defining the valid data window, wherein the initially defining comprises indicating at least one of:

an initial sequence number to be used in defining the valid data window, the initial sequence number being provided in response to initialization or re-initialization of one or more interconnects of the data communications network used to transport data; and an instance number to be used in defining the valid data window, the instance number being provided in response to initialization or re-initialization of one or more interconnects of the data communications network used to transport data, wherein the instance number is distinct from the sequence number attached to the forwarded data.

* * * * *